US008713690B2

(12) United States Patent
Harada et al.

(10) Patent No.: US 8,713,690 B2
(45) Date of Patent: *Apr. 29, 2014

(54) SECURE DATA EXCHANGE BETWEEN DATA PROCESSING SYSTEMS

(75) Inventors: Larry T. Harada, Mountain View, CA (US); Mark A. Dolecki, Columbus, OH (US); Christopher S. Purdum, Columbus, OH (US); C. Hudson Hendren, III, Strasburg, VA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/030,986

(22) Filed: Feb. 18, 2011

(65) Prior Publication Data

US 2011/0145590 A1 Jun. 16, 2011

Related U.S. Application Data

(63) Continuation of application No. 11/535,056, filed on Sep. 25, 2006, now Pat. No. 7,895,446, which is a continuation of application No. 09/323,415, filed on Jun. 1, 1999, now Pat. No. 7,146,505.

(51) Int. Cl.
*H04L 29/06* (2006.01)
*G06F 21/00* (2013.01)

(52) U.S. Cl.
USPC ............... 726/26; 713/182; 726/5; 726/28; 726/29; 705/26; 705/76

(58) Field of Classification Search
USPC ............ 713/150, 155, 182, 185; 726/2, 5, 14, 726/26–30; 709/223, 225; 705/18, 26, 50, 705/52, 64, 76
See application file for complete search history.

(56) References Cited

U.S. PATENT DOCUMENTS

| 4,238,853 | A | * | 12/1980 | Ehrsam et al. | ............... 380/45 |
| 4,578,530 | A | * | 3/1986 | Zeidler | .................... 705/71 |
| 5,245,656 | A | | 9/1993 | Loeb et al. | |

(Continued)

FOREIGN PATENT DOCUMENTS

| EP | 0848338 | 6/1998 |
| EP | 0855659 | 7/1998 |

(Continued)

OTHER PUBLICATIONS

Gabber et al., "How to Make Personalized Web Browsing Simple, Secure, and Anonymous," Financial Cryptography, International Conference, Feb. 24, 1997 (XP002059819), pp. 17-31.

(Continued)

*Primary Examiner* — Gilberto Barron, Jr.
*Assistant Examiner* — Abdulhakim Nobahar
(74) *Attorney, Agent, or Firm* — Keller Jolley Preece

(57) ABSTRACT

A data transfer method performed at a proxy server includes intercepting a data request from a client computer that is directed to a target server, encrypting profile information, augmenting the data request by adding the encrypted profile information to the data request, and sending the augmented data request to the target server. A data transfer method that is performed at an information server includes receiving a data request from a proxy server, extracting profile information added to the data request by the proxy server, using the extracted profile information to generate a response, and sending the response to the proxy server.

19 Claims, 5 Drawing Sheets

(56) References Cited

U.S. PATENT DOCUMENTS

| | | | |
|---|---|---|---|
| 5,586,260 A | 12/1996 | Hu | |
| 5,590,197 A | 12/1996 | Chen et al. | |
| 5,671,279 A | 9/1997 | Elgamal | |
| 5,673,322 A | 9/1997 | Pepe et al. | |
| 5,678,041 A | 10/1997 | Baker et al. | |
| 5,708,780 A | 1/1998 | Levergood et al. | |
| 5,740,252 A * | 4/1998 | Minor et al. | 713/153 |
| 5,740,361 A | 4/1998 | Brown | |
| 5,757,925 A * | 5/1998 | Faybishenko | 709/203 |
| 5,764,890 A | 6/1998 | Glasser et al. | |
| 5,802,320 A | 9/1998 | Baehr et al. | |
| 5,805,803 A | 9/1998 | Birrell et al. | |
| 5,812,769 A | 9/1998 | Graber et al. | |
| 5,815,665 A | 9/1998 | Teper et al. | |
| 5,818,446 A | 10/1998 | Bertram et al. | |
| 5,825,890 A | 10/1998 | Elgamal et al. | |
| 5,826,025 A | 10/1998 | Gramlich | |
| 5,826,242 A | 10/1998 | Montulli | |
| 5,845,070 A | 12/1998 | Ikudome | |
| 5,845,300 A | 12/1998 | Comer et al. | |
| 5,848,396 A | 12/1998 | Gerace | |
| 5,855,008 A | 12/1998 | Goldhaber et al. | |
| 5,889,956 A | 3/1999 | Hauser et al. | |
| 5,892,761 A | 4/1999 | Stracke, Jr. | |
| 5,905,872 A | 5/1999 | DeSimone et al. | |
| 5,933,827 A | 8/1999 | Cole et al. | |
| 5,941,954 A | 8/1999 | Kalajan | |
| 5,960,411 A | 9/1999 | Hartman et al. | |
| 5,961,593 A | 10/1999 | Gabber et al. | |
| 5,974,398 A | 10/1999 | Hanson et al. | |
| 5,978,799 A | 11/1999 | Hirsch | |
| 5,987,454 A | 11/1999 | Hobbs | |
| 5,991,735 A | 11/1999 | Gerace | |
| 5,991,795 A | 11/1999 | Howard et al. | |
| 5,991,810 A | 11/1999 | Shapiro et al. | |
| 6,029,175 A | 2/2000 | Chow et al. | |
| 6,038,598 A | 3/2000 | Danneels | |
| 6,041,357 A | 3/2000 | Kunzelman et al. | |
| 6,047,376 A | 4/2000 | Hosoe | |
| 6,049,821 A | 4/2000 | Theriault et al. | |
| 6,049,877 A | 4/2000 | White | |
| 6,052,785 A * | 4/2000 | Lin et al. | 726/5 |
| 6,073,175 A | 6/2000 | Tavs et al. | |
| 6,081,900 A | 6/2000 | Subramaniam et al. | |
| 6,092,053 A | 7/2000 | Boesch et al. | |
| 6,092,196 A | 7/2000 | Reiche | |
| 6,092,204 A | 7/2000 | Baker | |
| 6,105,027 A | 8/2000 | Schneider et al. | |
| 6,112,212 A | 8/2000 | Heitler | |
| 6,112,227 A | 8/2000 | Heiner | |
| 6,119,098 A | 9/2000 | Guyot et al. | |
| 6,128,627 A | 10/2000 | Mattis et al. | |
| 6,128,663 A | 10/2000 | Thomas | |
| 6,131,095 A | 10/2000 | Low et al. | |
| 6,138,162 A | 10/2000 | Pistriotto et al. | |
| 6,141,010 A | 10/2000 | Hoyle | |
| 6,144,996 A | 11/2000 | Starnes et al. | |
| 6,151,686 A | 11/2000 | McDonough et al. | |
| 6,161,145 A | 12/2000 | Bainbridge et al. | |
| 6,178,411 B1 | 1/2001 | Reiter | |
| 6,178,441 B1 | 1/2001 | Elnozahy | |
| 6,182,141 B1 | 1/2001 | Blum et al. | |
| 6,195,681 B1 | 2/2001 | Appleman et al. | |
| 6,212,563 B1 * | 4/2001 | Beser | 709/227 |
| 6,212,640 B1 | 4/2001 | Abdelnur et al. | |
| 6,223,215 B1 | 4/2001 | Hunt et al. | |
| 6,226,752 B1 | 5/2001 | Gupta et al. | |
| 6,243,864 B1 | 6/2001 | Odani et al. | |
| 6,253,202 B1 | 6/2001 | Gilmour | |
| 6,253,326 B1 | 6/2001 | Lincke et al. | |
| 6,272,492 B1 | 8/2001 | Kay | |
| 6,272,631 B1 * | 8/2001 | Thomlinson et al. | 713/155 |
| 6,286,043 B1 | 9/2001 | Cuomo et al. | |
| 6,286,046 B1 | 9/2001 | Bryant | |
| 6,289,462 B1 | 9/2001 | McNabb et al. | |
| 6,298,380 B1 | 10/2001 | Coile et al. | |
| 6,308,216 B1 | 10/2001 | Goldszmidt et al. | |
| 6,314,565 B1 | 11/2001 | Kenner et al. | |
| 6,321,336 B1 | 11/2001 | Applegate et al. | |
| 6,324,585 B1 | 11/2001 | Zhang et al. | |
| 6,330,561 B1 | 12/2001 | Cohen et al. | |
| 6,330,588 B1 | 12/2001 | Freeman | |
| 6,357,010 B1 | 3/2002 | Viets et al. | |
| 6,360,270 B1 | 3/2002 | Cherkasova et al. | |
| 6,373,950 B1 | 4/2002 | Rowney | |
| 6,385,592 B1 | 5/2002 | Angles et al. | |
| 6,389,460 B1 | 5/2002 | Stewart et al. | |
| 6,389,462 B1 | 5/2002 | Cohen et al. | |
| 6,393,407 B1 | 5/2002 | Middleton et al. | |
| 6,415,322 B1 | 7/2002 | Jaye | |
| 6,418,471 B1 | 7/2002 | Shelton et al. | |
| 6,421,781 B1 | 7/2002 | Fox et al. | |
| 6,434,608 B1 | 8/2002 | Desai | |
| 6,438,125 B1 | 8/2002 | Brothers | |
| 6,438,592 B1 | 8/2002 | Killian | |
| 6,438,652 B1 | 8/2002 | Jordan et al. | |
| 6,460,081 B1 * | 10/2002 | Doherty et al. | 709/225 |
| 6,460,141 B1 * | 10/2002 | Olden | 726/4 |
| 6,466,970 B1 | 10/2002 | Lee et al. | |
| 6,487,538 B1 * | 11/2002 | Gupta et al. | 705/14.66 |
| 6,487,592 B1 | 11/2002 | Sawyer et al. | |
| 6,490,602 B1 | 12/2002 | Kraemer | |
| 6,516,000 B1 | 2/2003 | Kshirsagar et al. | |
| 6,532,493 B1 | 3/2003 | Aviani et al. | |
| 6,564,243 B1 | 5/2003 | Yedidia et al. | |
| 6,571,295 B1 | 5/2003 | Sidana | |
| 6,587,836 B1 * | 7/2003 | Becar et al. | 705/26.35 |
| 6,606,643 B1 | 8/2003 | Emens et al. | |
| 6,606,657 B1 | 8/2003 | Zilberstein et al. | |
| 6,606,663 B1 | 8/2003 | Liao et al. | |
| 6,606,708 B1 | 8/2003 | Devine et al. | |
| 6,640,242 B1 | 10/2003 | O'Neal et al. | |
| 6,651,095 B2 | 11/2003 | Barlock et al. | |
| 6,687,732 B1 | 2/2004 | Bector et al. | |
| 6,687,746 B1 | 2/2004 | Shuster et al. | |
| 6,718,390 B1 | 4/2004 | Still et al. | |
| 6,735,631 B1 | 5/2004 | Oehrke et al. | |
| 6,760,746 B1 | 7/2004 | Schneider | |
| 6,766,454 B1 * | 7/2004 | Riggins | 713/185 |
| 6,769,019 B2 | 7/2004 | Ferguson | |
| 6,775,687 B1 | 8/2004 | Binding et al. | |
| 6,944,669 B1 | 9/2005 | Saccocio | |
| 7,103,018 B1 * | 9/2006 | Hansen et al. | 370/328 |
| 7,130,885 B2 | 10/2006 | Chandra et al. | |
| 7,146,505 B1 | 12/2006 | Harada et al. | |
| 7,225,249 B1 * | 5/2007 | Barry et al. | 709/227 |
| 7,272,639 B1 | 9/2007 | Levergood et al. | 709/218 |
| 7,275,086 B1 | 9/2007 | Bodnar | |
| 7,343,351 B1 | 3/2008 | Bishop et al. | |
| 7,401,115 B1 | 7/2008 | Arsenault | |
| 7,895,446 B2 | 2/2011 | Harada et al. | |
| 7,966,259 B1 * | 6/2011 | Bui | 705/50 |
| 7,996,460 B1 | 8/2011 | Arsenault | |
| 8,539,023 B2 | 9/2013 | Arsenault | |
| 2001/0023436 A1 * | 9/2001 | Srinivasan et al. | 709/219 |
| 2001/0039587 A1 * | 11/2001 | Uhler et al. | 709/229 |
| 2001/0047484 A1 | 11/2001 | Medvinsky et al. | |
| 2002/0052935 A1 | 5/2002 | Paxhia et al. | |
| 2002/0059402 A1 * | 5/2002 | Belanger | 709/220 |
| 2002/0087559 A1 | 7/2002 | Pratt | |
| 2003/0009430 A1 * | 1/2003 | Burkey et al. | 707/1 |
| 2003/0036974 A1 * | 2/2003 | Allen | 705/27 |
| 2005/0240992 A1 | 10/2005 | Coley et al. | |
| 2006/0047847 A1 | 3/2006 | Saccocio | |
| 2008/0201344 A1 | 8/2008 | Levergood et al. | |
| 2011/0282927 A1 | 11/2011 | Arsenault | |
| 2013/0073693 A1 | 3/2013 | Harada et al. | |
| 2013/0073861 A1 | 3/2013 | Harada et al. | |
| 2013/0073862 A1 | 3/2013 | Harada et al. | |
| 2013/0173693 A1 | 7/2013 | Arsenault | |
| 2013/0173694 A1 | 7/2013 | Arsenault | |
| 2013/0173695 A1 | 7/2013 | Arsenault | |

(56) References Cited

U.S. PATENT DOCUMENTS

| | | | |
|---|---|---|---|
| 2013/0179677 | A1 | 7/2013 | Harada et al. |
| 2013/0191905 | A1 | 7/2013 | Harada et al. |
| 2013/0311452 | A1 | 11/2013 | Arsenault |

FOREIGN PATENT DOCUMENTS

| | | |
|---|---|---|
| EP | 0893920 | 1/1999 |
| JP | 9-114783 | 5/1989 |
| JP | 11-31126 | 5/1997 |
| WO | WO 97/15885 | 5/1997 |
| WO | WO 98/31155 | 7/1998 |
| WO | WO 98/33130 | 7/1998 |
| WO | WO 98/36522 | 8/1998 |
| WO | WO 98/43150 | 10/1998 |
| WO | WO 98/45793 | 10/1998 |
| WO | WO 98/58334 | 12/1998 |
| WO | WO 99/00958 | 1/1999 |
| WO | WO 99/00960 | 1/1999 |
| WO | WO 99/03243 | 1/1999 |
| WO | WO 00/79432 | 12/2000 |
| WO | WO 01/043033 | 6/2001 |

OTHER PUBLICATIONS

Petitcolas et al., "WebGroup: A secure group access control tool for the World-Wide Web," Proceedings—the Workshop on Enabling Technologies: Infrastructure for Collaborative Enterprises, US, IEEE Computer Society Press, Los Alamitos, CA, 1998 (XP002142486), pp. 301-305.
U.S. Appl. No. 09/258,242, filed Feb. 26, 1999.
Wu et al., Virtual Proxy Servers for WWW and Intelligent Agents on the Internet, 1997 IEEEΩ.
R. Collier, Canadian Office Action, Application No. 2,363,571, Jan. 5, 2004, 3 pages.
"Sixth International World Wide Web Conference" Conference Proceedings, http://decweb.ethz.ch/WWW6/. Apr. 7-11, 1997.
"Extranet Security: What's Right for the Business?", Steve Trulan, p. 47, Information Systems Security, vol. 7, No. 1, Spring 1998.
"Exploiting User Behavior in Prefetching WWW Documents", El Saddik et al., pp. 302-311, Interactive Distributed Multimedia Systems and Telecommunications Services, 5th International Workshop 1998.
Network News (UK Edition), pp. 29-30, Nov. 18, 1998, Issue 156.
"Intercessory Objects within Channels" Barry Kitson, Telecom Research Laboratories, 1995.
"Webgroup: a secure group access control tool for the World-Wide Web", Petitcolas and Zhang pp. 301-305, Proceedings of Seventh IEEE International Workshops on Enabling Technologies: Infrastructure for Collaborative Enterprises, 1988.
"Notice of Reasons for Rejection," Japanese Patent Application No. 2000-601562, Jul. 8, 2004.
"Statement of Grounds of Opposition," Austrailian Patent Application No. 200035010 (769163), Jul. 15, 2004.
Japanese Office Action issued on Nov. 29, 2005 for JP 2001-500930, 3 pages. Translation of the Japanese Office Action, 2 pages.
Kamiba et al., "User Profile Management Agent", Information Processing Institute Study Report (97-HI-70), vol. 97, No. 2, Jan. 16, 1997, p. 1-8. Partial translation of publication, 3 pages.
"Recent Application Server Situations", ASCII NT, vol. 4, No. 3, Mar. 1, 1999, pp. 225-229. Partial translation of publication, 2 pages.
International Search Report issued in WO 00/73876 on Jan. 29, 2001.
U.S. Appl. No. 09/258,242, Apr. 1, 2003, Office Action.
U.S. Appl. No. 09/323,415, Aug. 12, 2002, Office Action.
U.S. Appl. No. 09/323,415, Sep. 17, 2003, Office Action.
U.S. Appl. No. 09/323,415, Feb. 24, 2004, Office Action.
U.S. Appl. No. 09/323,415, Sep. 3, 2004, Office Action.
U.S. Appl. No. 09/323,415, Mar. 23, 2005, Notice of Allowance.
U.S. Appl. No. 09/323,415, Mar. 7, 2006, Notice of Allowance.
U.S. Appl. No. 09/693,840, Dec. 5, 2003, Office Action.
U.S. Appl. No. 09/693,840, May 28, 2004, Office Action.
U.S. Appl. No. 09/693,840, Mar. 11, 2008, Notice of Allowance.
U.S. Appl. No. 09/693,860, Dec. 19, 2003, Office Action.
U.S. Appl. No. 09/693,860, Jul. 1, 2004, Office Action.
U.S. Appl. No. 09/693,860, Feb. 9, 2005, Notice of Allowance.
U.S. Appl. No. 09/693,860, May 3, 2005, Notice of Allowance.
U.S. Appl. No. 11/223,121, Aug. 19, 2008, Office Action.
U.S. Appl. No. 11/223,121, Feb. 2, 2009, Office Action.
U.S. Appl. No. 11/535,056, Jun. 23, 2008, Office Action.
U.S. Appl. No. 11/535,056, Feb. 26, 2009, Office Action.
U.S. Appl. No. 11/535,056, Feb. 22, 2010, Office Action.
U.S. Appl. No. 11/535,056, Jun. 24, 2010, Office Action.
U.S. Appl. No. 11/535,056, Oct. 18, 2010, Notice of Allowance.
U.S. Appl. No. 12/172,703, Apr. 28, 2010, Office Action.
U.S. Appl. No. 12/172,703, Oct. 15, 2010, Office Action.
U.S. Appl. No. 12/172,703, Mar. 30, 2011, Notice of Allowance.
U.S. Appl. No. 13/191,844, Sep. 28, 2011, Office Action.
U.S. Appl. No. 13/191,844, Mar. 14, 2012, Office Action.
U.S. Appl. No. 13/191,844, Oct. 1, 2012, Notice of Allowance.
U.S. Appl. No. 13/191,844, May 24, 2013, Notice of Allowance.
U.S. Appl. No. 13/613,892, Jul. 8, 2013, Office Action.
U.S. Appl. No. 13/614,201, May 31, 2013, Office Action.
U.S. Appl. No. 13/614,201, Sep. 13, 2013, Notice of Allowance.
U.S. Appl. No. 13/614,225, Jul. 22, 2013, Office Action.
U.S. Appl. No. 13/616,516, Jun. 27, 2013, Office Action.
U.S. Appl. No. 13/616,540, Jun. 26, 2013, Office Action.
U.S. Appl. No. 13/616,620, Mar. 20, 2013, Office Action.
U.S. Appl. No. 13/616,620, Oct. 2, 2013, Notice of Allowance.
U.S. Appl. No. 13/613,892, Dec. 10, 2013, Notice of Allowance.
U.S. Appl. No. 13/614,201, Nov. 22, 2013, Notice of Allowance.
U.S. Appl. No. 13/614,225, Dec. 10, 2013, Notice of Allowance.

\* cited by examiner

SECURE DATA EXCHANGE BETWEEN DATA PROCESSING SYSTEMS

This application is a continuation of allowed U.S. application Ser. No. 11/535,056 filed Sep. 25, 2006, (U.S. Pat. No. 7,895,446), which is a continuation of U.S. application Ser. No. 09/323,415 filed Jun. 1, 1999, (U.S. Pat. No. 7,146,505). Both are titled "Secure Data Exchange Between Data Processing Systems" and are incorporated by reference in their entirety.

BACKGROUND

FIG. 1 shows a computer network 100 that includes both client computers 111-113 and server computers 131-133. The network 100 also includes data connections that allow the client computers to communicate with the servers. Those data connections include access connections 114-116, a service provider's point of presence (POP) 110, network 120, proxy server 117, and network 130. POP 110 includes data communications equipment that allows a client computer 111-113 to connect to the network 120. For example, POP 110 may include dial-up modem banks, cable modem banks, a T1 interface, wireless communications equipment, or other data transmission equipment.

After a client computer 111-113 has been connected to the network 120 (through POP 110) it may exchange data with other computers on the network 120. Computers on different networks 120 and 130 also can exchange data with each other by sending their data request to proxy server 117 which, in turn, can forward their request to the destination computer, obtain a response from the destination, and return the response to the requesting computer.

The servers 131-133 and clients 111-113 may communicate with each other using the hypertext transfer protocol (HTTP). HTTP is a data communications protocol that is used by web browser programs (such as Microsoft Internet Explorer and Netscape Navigator) to communicate with web server applications (such as Microsoft Internet Information Server and Netscape Server). Thus, by executing a web browser, a client computer 111-113 can exchange data with a server 131-133 that is executing a web server application.

When a web server receives a HTTP data request from a browser, a web server application, such as a Common Gateway Interface (CGI) script, may be used to query databases, customize responses, and/or perform other processing used to generate a response. The web server application may need data about the client computer, the browser, its user, and/or other data in order to complete its processing of the data request. For example, a web server application may provide customized weather information based on a user's home address. The web application may obtain the user's address information by sending a data input form to the browser and receiving a user's response that contains the needed information. A web server application also may obtain needed data from web server environmental variables that are populated by data in HTTP header fields, by a web server, and/or by a web server sub-component. For example, a CGI script's response to a data request may depend on the type of browser originating the request. The CGI script may access a HTTP environment variable ("HTTP_USER_AGENT") populated by the web server using data from a "User-Agent" field in a HTTP header. The value of the HTTP_USER_AGENT variable identifies the type of browser originating a request so that the CGI script can customize its response to that browser.

A web server and a browser also may exchange web cookies that contain data. A web cookie is data file that can be automatically exchanged between browsers and servers along with the request and responses exchanged between the browsers and servers. When a web cookie is received by a browser, it can be stored at the client computer. During future transactions with the web server, the web cookie (and any data that it contains) can be sent back to the web server. By using data stored in web cookies, a web server's need to request data from a user may be reduced. However, since web cookies are typically stored on a client computer, they may be deleted and their data lost. Furthermore, if a user moves to another computer, web cookie information stored on the user's original computer will be unavailable to that user. These factors may reduce the utility of web cookies.

The present inventors recognize that information service systems, such as web servers, should provide convenient, secure, reliable, and simple means of interacting with users. The present inventors further recognize when a server must query a user for data or use web cookies for data storage and input, convenience, security, reliability, and simplicity may suffer. Consequently, the invention disclosed herein provides additional means of providing information to a web server application that may provide additional flexibility in implementing information systems.

SUMMARY

In general, in one aspect, the invention features a data transfer method performed at a proxy server. The method includes intercepting a data request from a client computer that is so directed to a target server, encrypting profile information, augmenting the data request by adding the encrypted profile information to the data request, and sending the augmented data request to the target server. In another aspect, the invention features a data transfer method performed at an information server. The method includes receiving a data request from a proxy server, extracting profile information added to the data request by the proxy server, using the extracted profile information to generate a response, and sending the response to the proxy server.

In general, in another aspect, the invention features a computer program residing on a computer-readable medium. The program includes instructions for causing a computer to intercept a data request from a client computer that is directed to a target server, encrypt profile information, augment the data request by adding the encrypted profile information to the data request, and send the augmented data request to the target server. In another aspect, the invention features a computer program residing on a computer-readable medium that includes instructions for causing a computer to receive a data request comprising encrypted profile information that was added to the data request by a proxy server, extract the profile information added by the proxy server, use the extracted profile information to generate a response, and send the response to the proxy server.

In general, in another aspect, the invention features a proxy server that includes a database, a network interface, a processor, and a memory. The database includes records storing user profile information. The network interface operatively couples the proxy server to a network to exchange data with a client computer and with a target server. The processor is operatively coupled to the network interface, the database, and a memory. The memory includes executable instructions for causing the processor to intercept a data request that is directed to a target server, retrieve a record from the database, encrypt profile information in the record, augment the data request by adding the encrypted profile information, and send the augmented data request to the target server In general, in another aspect, the invention features an information server that includes a network interface, a processor, and a memory. The network interface operatively couples the information server to a proxy server. The processor is operatively coupled to the network interface and to the memory. The memory includes executable instructions for causing the processor to receive a data request from the proxy server, decrypt user profile information added to the data request by the target server; and use the decrypted user profile information to generate a response to the data request.

Implementations may include one or more of the following features. A reference token may be exchanged between servers and used to refer to previously exchanged profile information. The reference token may be placed in subsequent data request sent by the proxy server to the target in place of full profile information. The profile information that is encrypted by the proxy server can be stored in proxy server database records. The particular user profile information encrypted and included in a data request can be selected based on an identity of a client computer user or a browser user. The identity may be determined using the Internet Engineering Task Force IDENT protocol or by using another method.

Implementations also may include one or more of the following features. Profile information may be encrypted at the proxy server using a session key as an encryption key, and may be decrypted at the target server using the same session key. The session key may be determined by the proxy server and sent to the target server using a public key cryptography algorithm and a public key associated with the target server. A data request may use the hypertext transfer protocol. Profile information extracted from the data request at the target/information server can be provided to a web application, such as a CGI script, that is used to generate a response.

The details of one or more embodiments of the invention are set forth in the accompanying drawings and the description below. Implementations may provide advantages including reduction of redundant data entry, reduction of user data entry errors, secure storage of user data, and automated user profile determination and dissemination. Different encryption keys can be used for different information servers, and each information server may establish characteristics associated with its encryption key. A web site may dynamically generate, maintain, and change its unique encryption key. This may help to minimize risk of replay attacks, message forgery, and message tampering. In addition, implementations may support multiple levels of security.

Other features, objects, and advantages of the invention will be apparent from the description and drawings, and from the claims.

DETAILED DESCRIPTION

Figure 1:
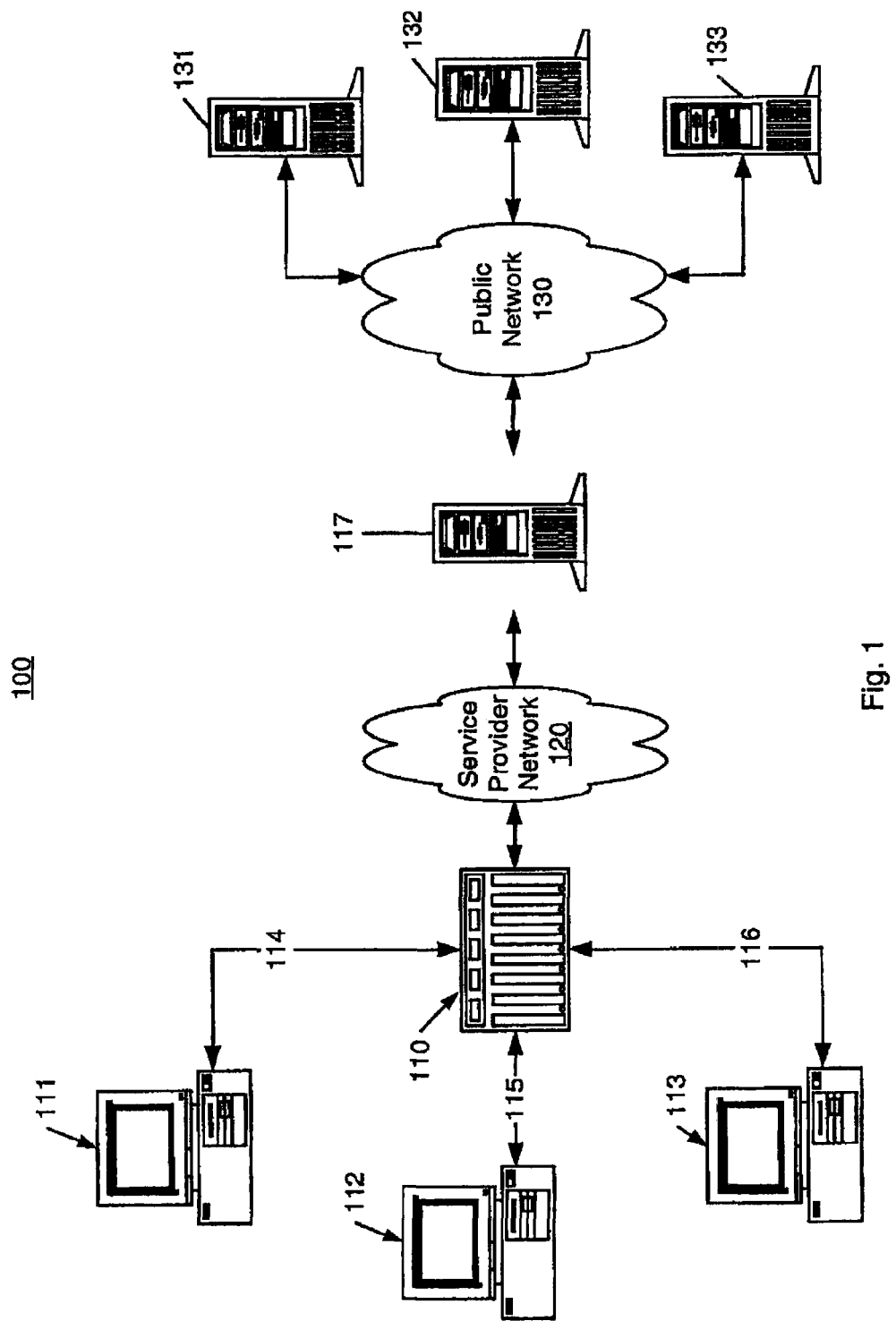
FIG. 1 is a computer network diagram.
Figure 2:
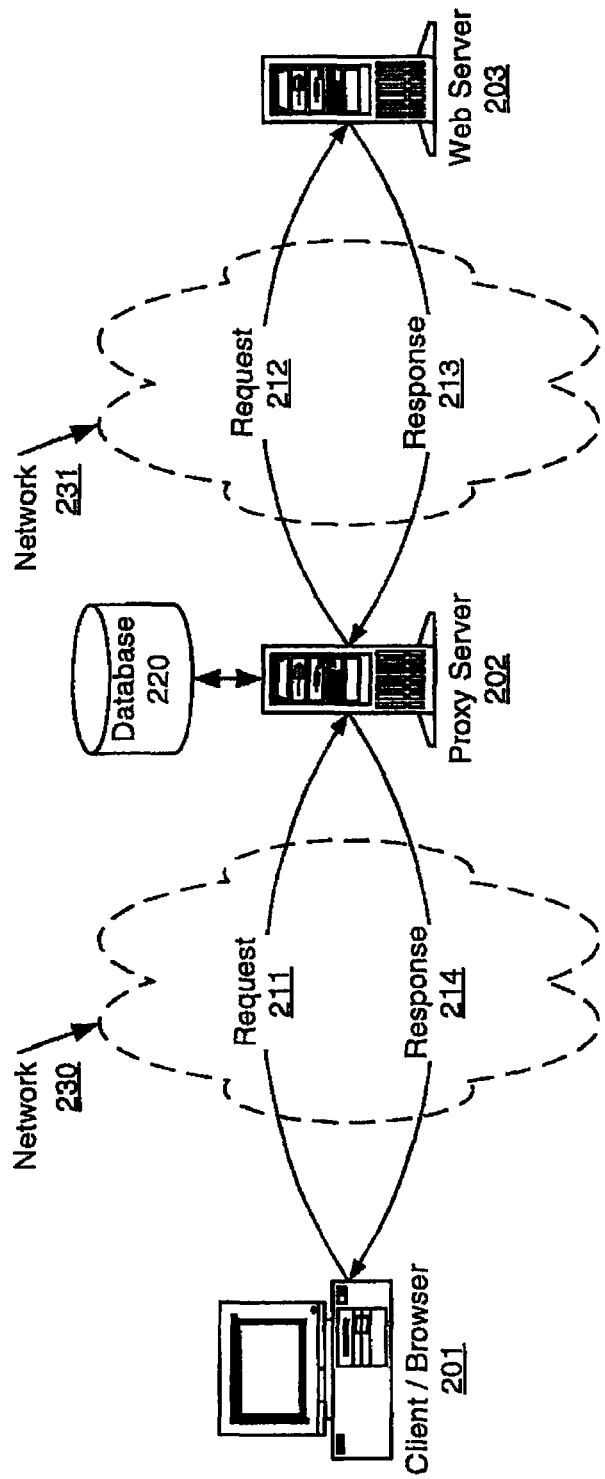
FIG. 2 is a computer network diagram.

Processing of an information request at a information server, such as a web server, can be facilitated by a data transfer mechanism in which data needed to process the request is stored at a proxy server and automatically transferred to the information servers. Such a data transfer mechanism can be used, for example, by an information service provider (ISP) or on-line service provider (OSP) to automatically transfer information about a user (a "user profile") to affiliated web sites. Referring to FIG. 2, to automatically transfer a user profile to a web server 203, the user profile information is first stored at a proxy server 202 in a database 220. When a HTTP data request 211 is received by the proxy server 202 from a web browser 201, the user profile information from database 220 is encapsulated in a request 212 that is forwarded by the proxy server to web server 203. The proxy server 202 encapsulates the user profile information in the request 212 by adding HTTP headers containing the user profile information to the headers received in the request 211.

Figure 3A:
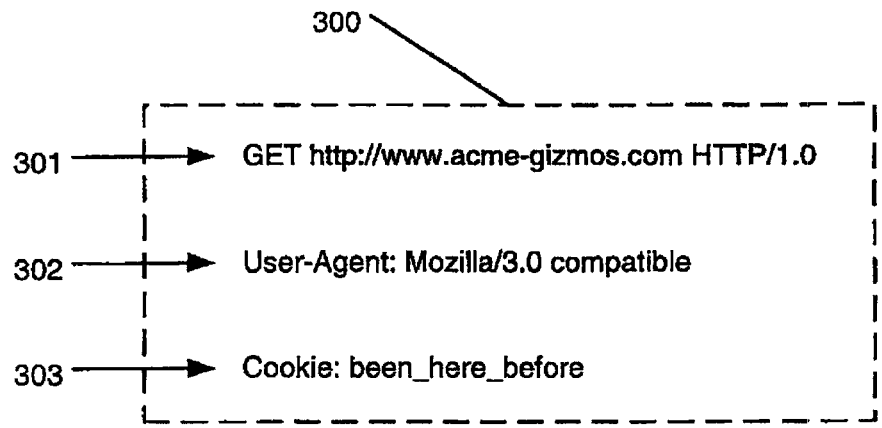
FIGS. 3A and 3B show exemplary HTTP headers.
Figure 3B:
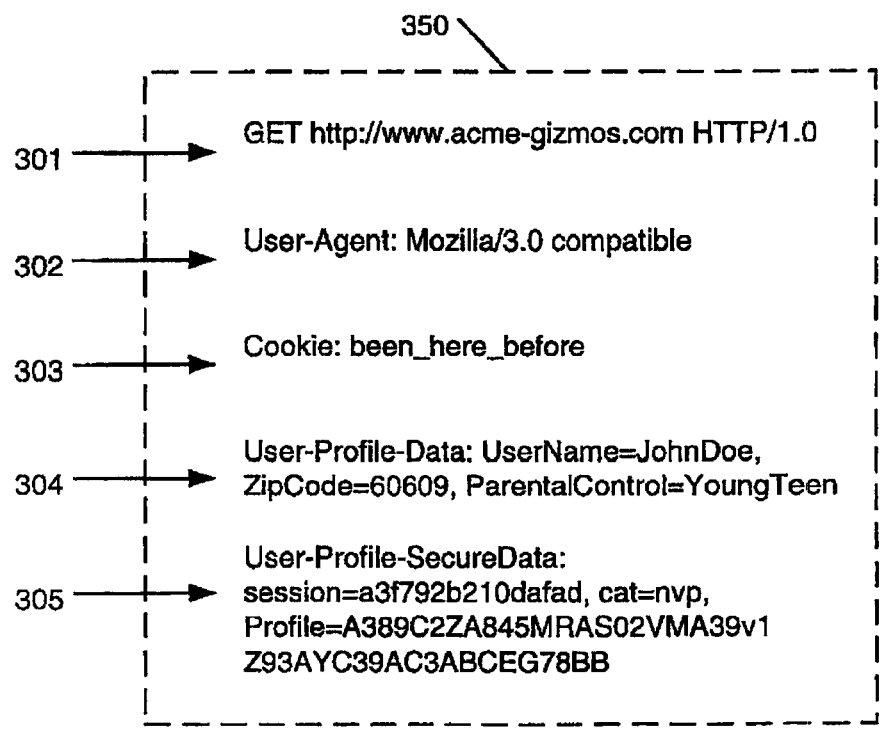

FIGS. 3A and 3B shows fields in HTTP requests. The fields 300 may be fields in a request 211 from a client computer 201, and the fields 350 may be fields in a request 212 forwarded by proxy server 202 to a web site 203. Referring to FIGS. 3A and 3B, each field 301-303 includes a HTTP field name and a value associated with the field. HTTP field names identify the associated field value. For example, the "User-Agent:" field name in field 302 indicates that request 300 originated at a "Mozilla/3.0 compatible" browser; and the "Cookie:" field name in field 303 includes the value "been_here_before" is a web cookie. When a HTTP request 211 having fields 300 is received at proxy 202, the proxy server 202 can add user profile information to the request 211 by adding additional HTTP fields 304-305 containing the profile information, thereby generating a new request 212 with the user profile information encapsulated in fields 304-305.

Figure 4B:
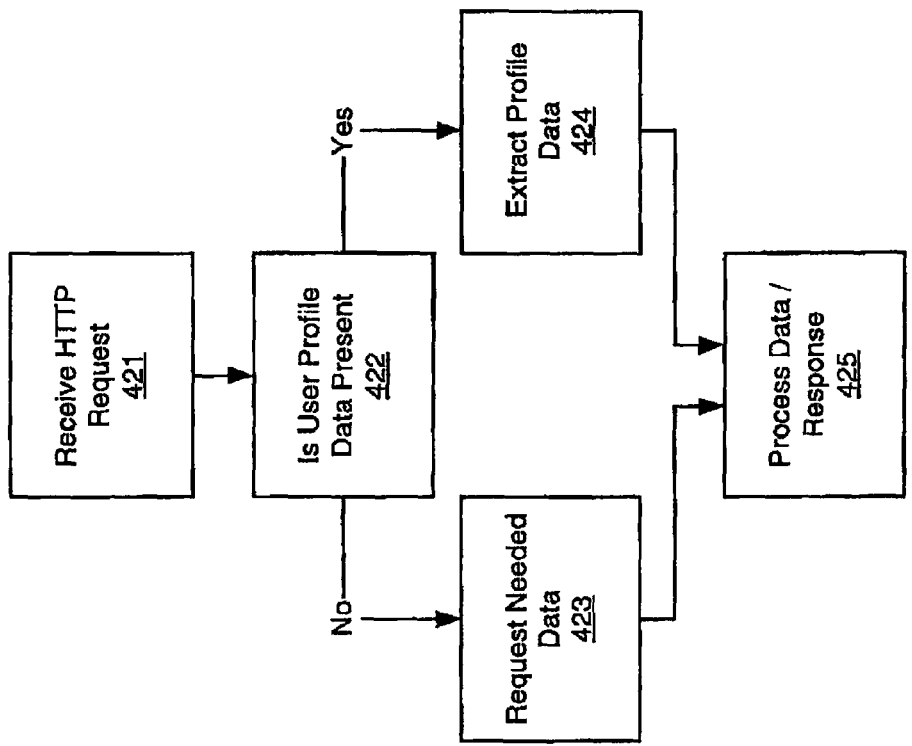
FIGS. 4A and 4B are flowcharts.
Figure 4A:
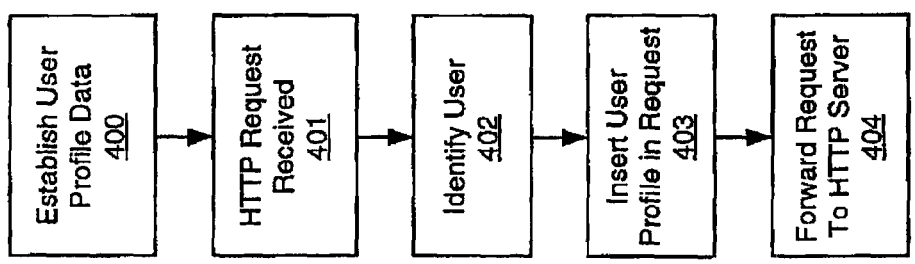

Database 220 may be a local or remote database that can store multiple user profiles. For example, the database 220 may be a database storing user profiles on a hard disk directly connected to the proxy server 202, or the database may be a SQL database at a remote system and accessed over a TCP/IP connection. Still other database 220 implementations may be used. Each user profile may be associated with a particular user or group of users. A user profile may be selected from the database 220 based on the identifying information associated with a particular computer or user of that computer. To determine the user's identity, a proxy server may use a table or database that associates user identity information with network connection information. For example, referring to FIGS. 2, 4A, and 4B, when a client computer 201 connects to a network 230, the client computer's user may submit name and password information to a POP or to a login server. The POP or login server may then send the user name and network connection information unique to that user (such as a unique combination of TCP/IP address and port number) to the proxy server 202 where it is stored in a database 220 (step 400). When the proxy server 202 receives a subsequent HTTP request 211 (step 401), the proxy server can identify the user associated with the request by querying the database of stored name and network connection associations. A proxy server also may identify a user using the IDENT protocol. The IDENT protocol is an Internet protocol that allows a computer to ask another computer for the name of the user. The IDENT protocol is further described in Internet Engineering Task Force (IETF) document RFC1413.

When the proxy server 202 has identified the user (step 402), the proxy server can retrieve a user profile associated with that user from its database 220. The proxy server may then add HTTP fields containing user profile information to fields in the original HTTP request 211 (step 403). For example, header fields 304-305 may be added to the original header fields 301-303 from request 211. Field 304 may include unencrypted user profile data ("UserName=John_Doe, ZipCode=60609, ParentalControl=YoungTeen), while field 305 may include encrypted user profile data. Encryption of data in the field 305 may use the SecureData protocol (explained later). The proxy server thereby forms the modified HTTP request 212 containing the user profile data. The modified request 212 may then be forwarded by the proxy server for receipt at a web site (steps 404 and 421).

Particular web servers may or may not be configured to recognize the user profile data fields 304-305. A web server that is not configured to recognize the user profile fields 304-305 may ignore the fields. A web server that is configured to recognize the user profile fields 304-305 can extract the profile data from the field 304-305 (steps 422 and 424). Extraction of user profile data in the field 305 may include decryption of the user profile data in encrypted field 305. The extracted user profile data can be used, for example, to generate or customize data sent in response 213 to the proxy server for forwarding as a response 214 to a user or client computer (step 425). For example, a tourist information web server may customize a page based user profile data specifying a browser user's age, and interest. If a web server looks for a user profile field 304-305 in the request 212, and the user profile field is not present, the server may use "traditional" data input mechanisms (such as forms and web cookies) to obtain needed data from a user (step 422-423). After the necessary data is obtained, the web server 203 can generate a response (step 425).

Exchange of user profile data between a proxy server 202 and a web server 203 may implemented using custom filtering software ("proxy data exchange filter" software) that can be added to commercially available proxy and web site server software. For example, Microsoft Internet Information Server (IIS) provides an application programming interface known as the information server application programming interface (ISAPI) that allows custom filtering software to be added to an IIS web site. A Netscape web site server provides an application programming interface known as the Netscape server application programming interface (NSAPI) that may also be used to develop custom filtering software. When a request 212 from the proxy server 203 is received at an IIS or Netscape server web site, the request 212 is passed to the proxy data exchange filter by the IIS or Netscape server software and the user profile data is extracted from the headers 304-305. The extracted profile data may then be made available as HTTP environment variables, database entries, or other data exchange structures that can be used by web applications. The remaining header information in request 212 (e.g., the original information from request 211), may then be processed by the web server to obtain response 213 information.

A proxy server 202 and web server 203 may implement the SecureData protocol so (described below) to encrypt user profile data. Encrypted user profile data may be indicated by a special HTTP header. For example, the field name "User-Profile-SecureData" in field 305 indicates that the field value segment of field 305 contains encrypted profile data.

The SecureData protocol uses multiple cryptography algorithms to provide secure user profile data transfers between a proxy server 202 and a web server 203. For example, the SecureData protocol may use the Rivest, Shamir, Adelman (RSA) public key encryption algorithm or the pretty-good-privacy (PGP) public key cryptography algorithm along with the RSA RC4 symmetric encryption algorithm. Additional information on the RC4 algorithm can be found, for example, in *Applied Cryptography*, 2nd edition, By Bruce Schneier, John Wiley & Sons, 1996.

Figure 5:
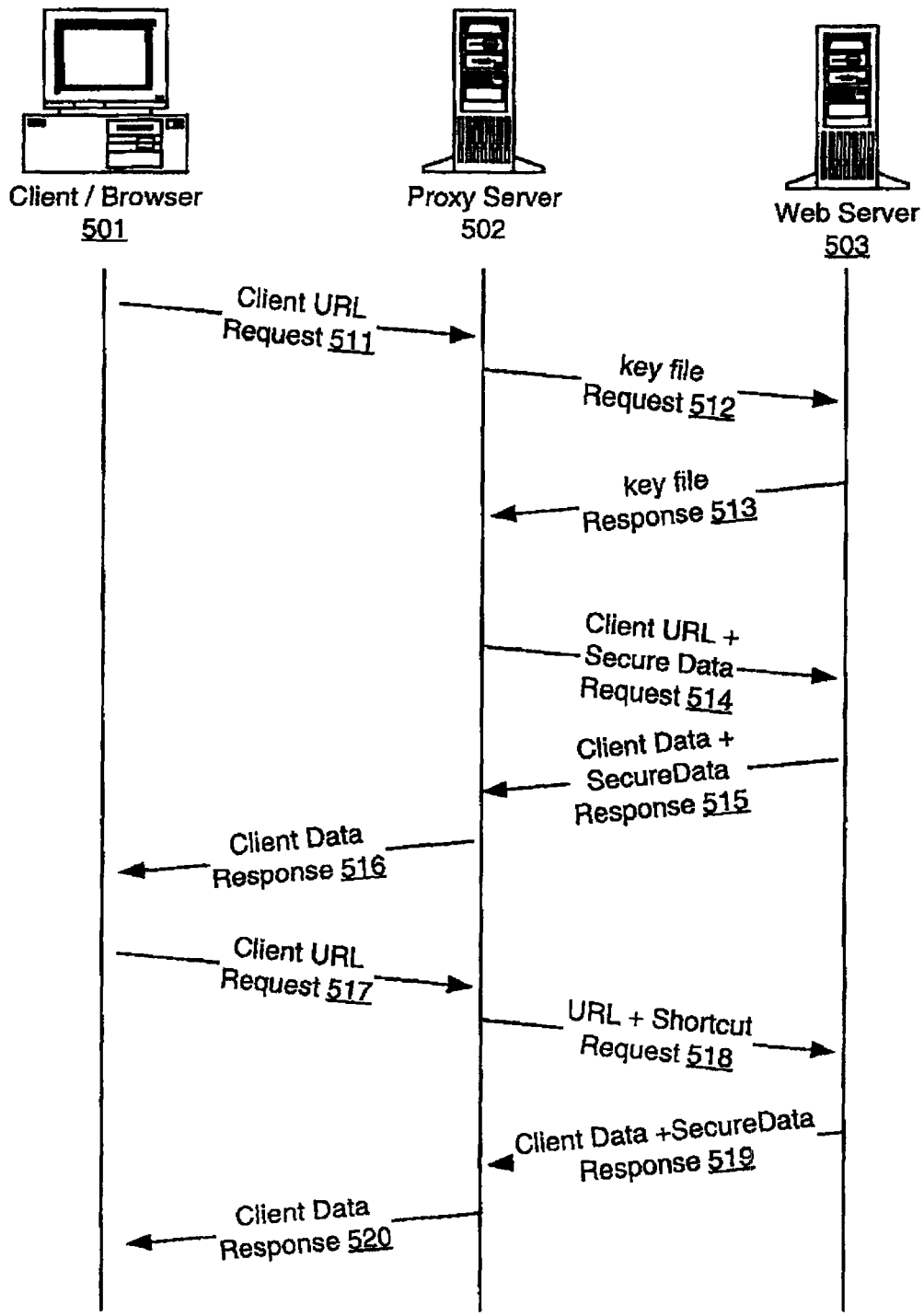
FIG. 5 is a message flow diagram.

User profile information may be encrypted at proxy server 202 using a symmetric encryption algorithm. A symmetric encryption algorithm, such as the RSA RC4 algorithm, uses the same encryption key (referred to herein as a "session" key) to encrypt and decrypt data. The proxy server 202 may encrypt user profile data and place it in a HTTP field in request message 212. The proxy server 202 can also separately encrypt the session key using a public key cryptography algorithm and the public key of the web server 203. The public key encrypted session key may also be placed in the request message 212, or may be sent separately to the web server 203. When the web server 203 has received the encrypted session key and user profile data, the web server 203 can decrypt its session key by using the public key cryptography algorithm and the web server's private key. The web server 203 may then decrypt the user profile information using the decrypted session key. FIG. 5 shows further details of an implementation in which a request message may include both the encrypted session key and the encrypted user profile data.

Referring to FIG. 5, when a request 511 is received at the proxy server 502, the proxy server determines whether it should add encrypted user profile data to the request. To do so, the proxy server may extract a destination web site address from URL information in the request 511, and query a database to determine whether the destination web site is to receive user profile information and whether the information is to be encrypted. If the destination web site is to receive encrypted user profile information, the proxy server 502 may then query its database to determine whether it has a valid public key for the web server 503. If the proxy server 502 has a valid public key, the proxy server can use the public key to encrypt session key information that can be provided to a symmetric encryption algorithm to encrypt user profile data. The encrypted session key and user profile data may then be forwarded in requests 514 to the web server 503.

If the proxy server 502 does not have a valid public key for web server 503, the proxy server will obtain the public key from the web server 503 using a HTTP request 512. The request 512 includes a URL that identifies a public key file ("pub_key_file") stored on the server 503. The public key file may include additional information used by the proxy server 502. For example, the public key file may include the length of the public key, a SecureData protocol version number, a list of supported encryption algorithms, and shortcut configuration information ("shortcut" information is further explained, below).

An exemplary public key may have the format shown below (chevrons '<' and '>' delineate fields in the public key file and brackets '[' and ']' delineate optional information):

| Exemplary Public Key File |
| --- |
| <public key = length-of-key  key> |
| [<Version = SecureData protocol version number>] |
| [<crypto = <encryption method>] |
| [<shortcut =[none\|low\|med\|high\|max]>] |

The web server's public key file is returned to the proxy server 503 in a HTTP response 513. The web server 503 may provide additional SecureData protocol information in HTTP fields of response 513 and/or in the public key file returned by the response message 513. For example, HTTP fields in response 513 may specify a time to live (TTL) for the key. The TTL value can be used to indicate the period during which the public key is valid.

A proxy server 502 or web server 503 may check a SecureData protocol version number returned in the public key file, in request 512 and/or in response 513 to ensure that the protocol is functioning properly and to recover from or to avoid errors. For example, if a proxy server 502 detects that protocol versions numbers in a retrieved public key file and those in a header of a response 513 do not match, the proxy server may re-submit the request 512 to the server 503. When the request 512 is re-submitted, the proxy server 502 can include the HTTP "no-cache" pragma to instruct caching systems between the proxy 502 and the web server 503 not to use cached data. This may help avoid errors introduced by using stale cached data. When the proxy server 502 has received the web server's public key, it may cache the public key subject to a time-to-live (TTL) value specified by the web server 503 and/or the proxy server's own TTL policies.

If the proxy server 502 is unable to retrieve a web server's public key information or the public key information is otherwise unusable, the proxy server can add a problem report information to fields in a HTTP request 514 to indicate why the public key information is unusable. For example, the proxy server may indicate that the key information has been corrupted or a protocol version number or encryption level specified in the public key file is not supported. If the a web server's public key information is unusable and, consequently, the SecureData encryption protocol cannot be used, a proxy server may continue to forward the HTTP requests from browser clients to the web server without adding additional SecureData proxy headers. Alternatively the proxy server may block or otherwise filter request to the web server. The specific behavior may be defined on a per-web server basis using configuration information stored at the proxy server 502.

Once the proxy server 502 has the public key of web server 503, the proxy server can use the public key to encrypt session key data. The encrypted session key data may then be added to HTTP fields in the request from a browser or client computer 511 to form a modified request 514 that includes the public-key-encrypted session key information. The proxy server also can encrypt the user profile data using the session key information and a symmetric encryption algorithm and place the encrypted user profile data in HTTP fields in the modified request 514. For example, referring to FIG. 3B, the field 305 includes session key data "session=a3f792b210dafad" that may be public-key encrypted, and user profile data "Profile= A389C2ZA845MRAS02VMA39v1Z93AYC39AC3ABCE G78BB" that may be encrypted using a symmetric algorithm.

Different web server's or groups of web servers can have different session keys. A web server's session key may be formed by combining a "master" session key that is the same for a group of web servers with a key mask that can be used to create a unique session key for a web server or a group of web servers. For example, a 64-bit master session key may be combined with a 64-bit key mask using an exclusive-or ('XOR') operation, to yield a unique 64-bit session key. In some implementations, the master session key may be the proxy server's public key. Other methods of generating unique keys can be used. The session key data can in field 305 (e.g., "session=a3f792b210dafad") can include numerous sub-fields. For example, the session key data can include a master key, a key mask, a timestamp, a URL hash, a Proxy IP field, and an encoding scheme field. These fields can contain the following data:

Master key: The master key is a value that is generated by the SecureData proxy server that can be combined with a key mask to generate a unique session key. The proxy server may periodically generate a new master session key. For example, a new master session key may be generated every n minutes. The Master key may be the proxy server's public key.

Key mask: The key mask is a value generated by a SecureData proxy server that is unique to a particular web site and which can be combined with a master key to generate a unique session key for that web site. A master key and a key mask can be combined using an exclusive-or ('XOR') operation, by appending the keys together, or by another key combination algorithm. A new key mask may be periodically generated. For example, a new key mask may be generated every n minutes.

Timestamp: A timestamp value may be added to the public-key encrypted data to make replay attacks more difficult. The timestamp value can be checked by the receiving web server and compared to the current time. If the difference between the timestamp value and current time exceeds a threshold value, the request may be denied or other error recovery or security procedures may be employed.

URL hash: A hash value derived from a requested URL may be added to the public-key encrypted data to make forging or tampering more difficult.

Proxy IP: The IP address of the proxy server be inserted in the session key data. When a request 514 is received at a web server 503, the web server may compare the IP address in the proxy IP field to help confirm that the request came from a particular proxy server 502. If the addresses differ, the request 514 may be rejected or other error recovery or security procedures may be employed.

Encoding scheme: Encoding scheme data may be sent from the SecureData proxy server to a SecureData web server to identify how user profile data is encoded. For example, the encoding scheme value may indicate that profile data is in a binary (bin) form, or in name-value pair (nvp) form (which may be expressed using the Abstract Syntax Notation 1 (ASN.1) or other name-value coding scheme), or in another form.

The proxy server 502 can use a web server's unique session key to encrypt user profile data that is add it to the field 305. In some implementations, the user profile data may be placed in one or more additional fields. The request 514, now containing the public-key encrypted session data and the symmetric encrypted user profile data, is then sent to web server 503.

When request 514 is received by the web server 503, the request can be passed to proxy data exchange filter software that can extract the added fields 304-205 from the request 514, decrypt the session key and the user profile information contained in the fields 304-205, and make the user profile information available to web server applications. The user profile information may be made available to web server applications by setting HTTP environment variables, by storing it in a database, by placing it in shared memory, and/or using other data exchange techniques. The proxy data exchange filter software may then pass the request 514 back to the web server for further processing and for generation of a response 515.

The web server 503 can store received profile data in a local database for future request processing purposes. The web server 503 may return a shortcut token to the proxy server 502. The proxy server 502 may add the shortcut token to a subsequent request 518 in place of the 'full' user profile data sent in the request 514. This can be used to reduce the amount of data that needs be transferred in subsequent request 518. A shortcut token can be an index value, database query information, file name, other pointer data, or an arbitrary value generated by the web site 503 and used to reference the stored user profile data.

A web server's public key file may be sent to the proxy server 502 using a security level specified by the site 503. For example, a web site's public key file include data indicating that the web site will use a specified one of the following shortcut key security levels:

none: If "none" is specified, the shortcut token is sent to the proxy server as a clear (e.g., unencrypted value).

low: If "low" is specified, the shortcut token is sent to the proxy server as a clear value and is accompanied by a hash of a previously requested URL.

medium: If "medium" is specified, the "low" security level information is further accompanied by a timestamp value.

high: If "high" is specified, the "medium" security information is further accompanied by the proxy server's IP address.

max: If "max" is specified, the "high" security information is further accompanied by a sequence counter value. The sequence counter value may be based on a initial URL hash, the key mask, or other value, and is incremented in subsequent transactions.

At low, medium, high, and max security levels, the shortcut token and related security data can be sent in encrypted form using, for example, the proxy server's public key (which may be the master key value). Shortcut token security levels may also be indicated using HTTP fields in a response 513 or 515, or may be specified using data stored in a configuration database at the proxy server 513 using a data entry terminal.

A proxy server 502 or web server 503 may include other HTTP fields in a request 512, 514, 518 or in a response 513, 515, 519 to control user profile data transfers and/or the operation of the SecureData protocol. For example, HTTP fields in requests and/or responses may specify the following directives:

Flush=<shortcut value|ALL>: The 'Flush' directive can be sent to the proxy server 502 to discard a specified shortcut token or to discard all shortcut tokens from a particular web server. The 'Flush' directive may also be sent to a web server to cause the web server to discard stored user profile data associated with a particular shortcut token or to discard all stored user profile data associated with the sending proxy server. This directive may be used by a web server 503 or proxy server 502 that is performing a reset operation.

WrongKey: The WrongKey directive indicate that improper security protocol information was received. A proxy server that receives the WrongKey directive may re-send a request using a HTTP "no-cache" pragma. The "no-cache" pragma indicates that cached data should not be used to satisfy the request.

SendFull: A web server can issue a SendFull directive to indicate that a proxy server should send "full" user profile data (rather than a shortcut token) in a subsequent HTTP request.

TTL=<n>: The TTL (time to live) directive specifies a period (n, in seconds) during which a shortcut token is valid. Similar directives may be included in requests or response to indicate time-to-live values for other data, such as session keys and public keys.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. Nevertheless, it will be understood that various modifications may be made without departing from the spirit and scope of the invention. For example, server, proxy, and client protocols need not use the HTTP protocol. Alternate protocols and data formats may be used such as file transfer protocol (YIP) or network news transfer protocol (NNTP). Accordingly, other embodiments are within the scope of the following claims.

What is claimed is:

1. A method comprising:
    receiving, at a first hardware server, user profile information associated with a user of a client application;
    storing the user profile information at the first hardware server in a non-transitory storage device;
    generating, at the first hardware server, an identifier associated with the user profile information;
    receiving, at the first hardware server, a request including the identifier, the request being sent from a second hardware server;
    extracting the identifier from the request;
    accessing the non-transitory storage device at the first hardware server in which the user profile information for the user was stored prior to the first hardware server receiving the request;
    retrieving the user profile information from the non-transitory storage device based on the extracted identifier;
    generating a response, by the first hardware server, to the request using the retrieved user profile information; and
    sending the response to the second hardware server.

2. The method of claim 1, wherein the request is a second request that is subsequent to a first request, and wherein the method further comprises:
    receiving the user profile information with the first request, the user profile information being encrypted;
    parsing the first request to extract the encrypted user profile information; and
    decrypting the encrypted user profile information extracted from the first request;

wherein storing the user profile information in the non-transitory storage device comprises storing the decrypted user profile information; and wherein the identifier comprises a token.

3. The method of claim 2, wherein encrypting the user profile information comprises determining a session key and using the session key to encrypt the user profile information.

4. The method of claim 3, further comprising:
encrypting the session key; and
appending the encrypted session key to the first request.

5. The method of claim 4, wherein:
using the session key to encrypt the user profile information comprises using the session key and a symmetric encryption algorithm to encrypt the user profile information, and
encrypting the session key comprises encrypting the session key using a public key encryption algorithm and a public key associated with the first hardware server.

6. The method of claim 2, further comprising:
determining an IP address associated with a client computer of the user; and
querying a database to determine an identity associated with the IP address.

7. A method comprising:
receiving, at a first hardware server, user profile information associated with a user of a client device;
storing the user profile information at the first hardware server in a non-transitory storage device;
generating, by the first hardware server, an identifier associated with the user profile information;
receiving at the first hardware server, a request from the client device, the request having been modified by a device other than the client device to include the identifier associated with the user of the client device;
extracting the identifier from the request;
accessing the non-transitory storage device at the first hardware server, wherein the user profile information for the user was stored prior to the first hardware server receiving the request from the client device;
retrieving the user profile information from the non-transitory storage device based on the extracted identifier;
customizing, by the first hardware server, data based on the retrieved user profile information;
generating a response to the request that includes the customized data; and
sending, from the first hardware server, the response to the client device.

8. The method of claim 7, wherein the request is a second request that is subsequent to a first request, and wherein the method further comprises:
receiving, from the client device, the first request including the user profile information, the user profile information being encrypted;
extracting the encrypted user profile information from the first request; and
decrypting the encrypted user profile information;
wherein storing the user profile information in the non-transitory storage device comprises storing the decrypted user profile information.

9. The method of claim 8, wherein the first request includes a session key, and decrypting the encrypted user profile information comprises decrypting the encrypted user profile information using the session key.

10. The method of claim 9, further comprising decrypting the session key.

11. The method of claim 10, wherein:
decrypting the session key comprises decrypting the session key using a public key algorithm and a private key of the first hardware server, and
decrypting the encrypted user profile information using the session key comprises decrypting the encrypted user profile information using a symmetric decryption algorithm and the session key.

12. The method of claim 7, further comprising:
receiving a flush directive; and
in response to receiving the flush directive, discarding the user profile information stored in the storage device.

13. A non-transitory computer-readable storage medium storing a computer program, the computer program comprising instructions, which when executed by at least one processor, cause a computer system to perform a method comprising:
receiving, at a first hardware server, user profile information associated with a user of a client application;
storing the user profile information at the first hardware server in a non-transitory storage device;
generating, at the first hardware server, an identifier associated with the user profile information;
receiving, at the first hardware server, a request including the identifier associated with the user profile information, the request being sent from a second hardware server;
extracting the identifier from the request;
accessing the non-transitory storage device at the first hardware server in which the user profile information for the user was stored prior to the first hardware server receiving the request;
retrieving the user profile information from the non-transitory storage device based on the extracted identifier;
generating a response, by the first hardware server, to the request using the retrieved user profile information; and
sending the response to the second hardware server.

14. The non-transitory computer-readable storage medium of claim 13, further comprising instructions, that when executed by the at least one processor, cause the computer system to perform the method comprising:
receiving the user profile information with a first request, wherein the request is a second request that is subsequent to the first request and wherein the user profile information is encrypted;
parsing the first request to extract the encrypted user profile information; and
decrypting the encrypted user profile information extracted from the first request;
wherein storing the user profile information in the non-transitory storage device comprises storing; and
wherein the identifier comprises a token
the decrypted user profile information.

15. The non-transitory computer-readable storage medium of claim 14, wherein: to encrypt the user profile information, the instructions further comprise instructions for causing the at least one processor to determine a session key and use the session key to encrypt the user profile information.

16. The non-transitory computer-readable storage medium of claim 15, further comprising instructions for causing the at least one processor to:
encrypt the session key; and
append the encrypted session key to the initial request to create the modified initial request.

17. The non-transitory computer-readable storage medium of claim 16, wherein:
to use the session key to encrypt the profile information, the instructions further comprise instructions for causing the at least one processor to use the session key and a symmetric encryption algorithm to encrypt the user profile information, and to encrypt the session key, the instructions further comprises instructions for causing the at least one processor to encrypt the session key using a public key encryption algorithm and a public key associated with the first hardware server.

18. The non-transitory computer-readable storage medium of claim 13, further comprising instructions for causing the at least one processor to send a flush directive to the first hardware server such that the first hardware server discards the user profile information stored in the storage device associated with the first hardware server.

19. A method comprising:
receiving, at a first hardware server from a client device, a first request including encrypted user profile information;
extracting the encrypted user profile information from the first request;
decrypting the encrypted user profile information;
storing the decrypted user profile information in a storage device at the first hardware server;
generating, at the first hardware server, an identifier associated with the user profile information;
sending, to the client device, the identifier with a first response to the first request;
receiving, at the first hardware server from a second hardware server, a second request including the identifier;
extracting the identifier from the second request;
accessing the storage device at the first hardware server, wherein the profile information for the user was stored in the storage device prior to the first hardware server receiving the second request from the client device;
retrieving the user profile information from the storage device based on the extracted identifier;
generating, by the first hardware server, a second response to the second request using the retrieved user profile information; and
sending, from the first hardware server, the second response to the second hardware server.

* * * * *